United States Patent

Girod et al.

Patent Number: 5,818,972
Date of Patent: *Oct. 6, 1998

[54] METHOD AND APPARATUS FOR ENHANCING IMAGES USING HELPER SIGNALS

[75] Inventors: Bernd Girod, Spardorf, Germany; Edward H. Adelson, Cambridge, Mass.

[73] Assignee: RealNetworks, Inc., Seattle, Wash.

[*] Notice: This patent issued on a continued prosecution application filed under 37 CFR 1.53(d), and is subject to the twenty year patent term provisions of 35 U.S.C. 154(a)(2).

[21] Appl. No.: 480,169

[22] Filed: Jun. 7, 1995

[51] Int. Cl.$^6$ ............................................... G06K 9/40
[52] U.S. Cl. ........................... 382/260; 382/254; 382/269; 348/627
[58] Field of Search ................. 382/275, 260, 382/261, 274, 263, 264, 262, 266, 269, 254; 348/606, 625, 607, 610, 627, 242; 358/463, 447, 455, 518, 532, 462; 364/724.014

[56] References Cited

U.S. PATENT DOCUMENTS

| | | |
|---|---|---|
| 4,142,211 | 2/1979 | Faroudja . |
| 4,163,258 | 7/1979 | Ebihara et al. .......................... 348/618 |
| 4,442,454 | 4/1984 | Powell . |
| 4,446,484 | 5/1984 | Powell . |
| 4,463,381 | 7/1984 | Powell et al. . |
| 4,504,864 | 3/1985 | Anastassiou et al. . |
| 4,549,212 | 10/1985 | Bayer . |
| 4,561,022 | 12/1985 | Bayer . |
| 4,575,760 | 3/1986 | Nakagaki et al. . |
| 4,805,031 | 2/1989 | Powell . |
| 4,901,150 | 2/1990 | Klingelhofer et al. . |
| 4,926,261 | 5/1990 | Matsumoto et al. . |
| 4,991,021 | 2/1991 | Nikoh et al. ............................. 348/606 |
| 5,128,791 | 7/1992 | LeGall ..................... 348/469 |
| 5,166,810 | 11/1992 | Sorimachi et al. ..................... 358/451 |
| 5,212,659 | 5/1993 | Scott ................................... 364/724.1 |
| 5,541,864 | 7/1996 | Van Bavel .......................... 364/724.1 |

OTHER PUBLICATIONS

*A Method for the Digital Enhancement of Unsharp, Grainy Images,* Powell et al., (Jul. 1982), pp. 179–183.

Primary Examiner—Jose L. Couso
Assistant Examiner—Matthew C. Bella
Attorney, Agent, or Firm—Kudirka & Jobse, LLP

[57] ABSTRACT

A system for, and method of, enhancing a digitized image signal according to a helper signal architecture are described. The architecture includes an analysis filter, responsive to a digitized image signal, for filtering the digitized image signal, corresponding to a first frequency band, to produce a first frequency band signal. The first frequency band signal is then applied to a point operator, which modifies the first frequency band signal in accordance with a non-linear characteristic. The non-linear characteristic includes a first region having a negative slope for low amplitude input signals. The non-linearity further includes a second region having a positive slope for informational components of an input signal so that informational components of the first frequency band signal cause the point operator to produce a modified signal having components that relate to the input signal according to the positive slope. The modified signal is then received by an synthesis filter, corresponding to the analysis filter, to produce a helper signal. The helper signal and the digitized image signal are then added to yield an enhanced digitized image signal.

19 Claims, 6 Drawing Sheets

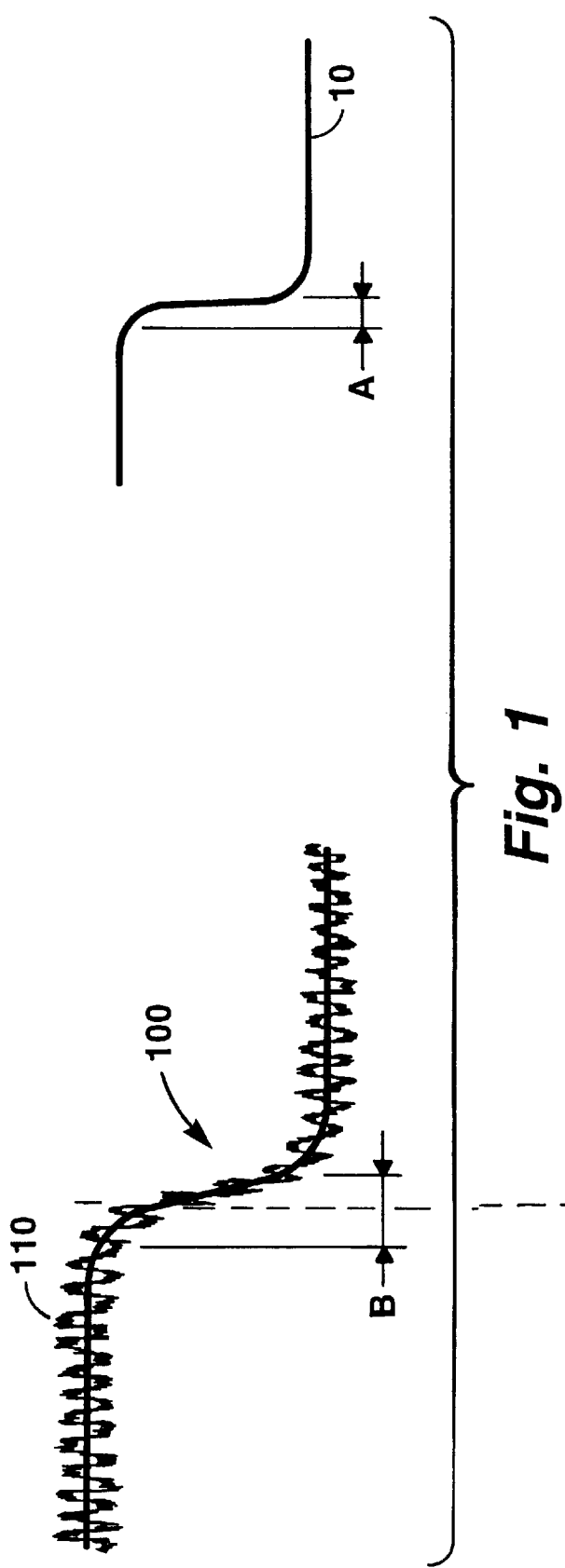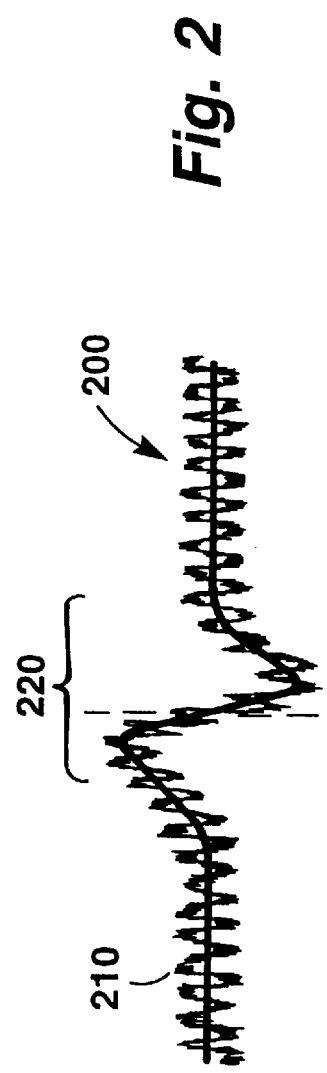

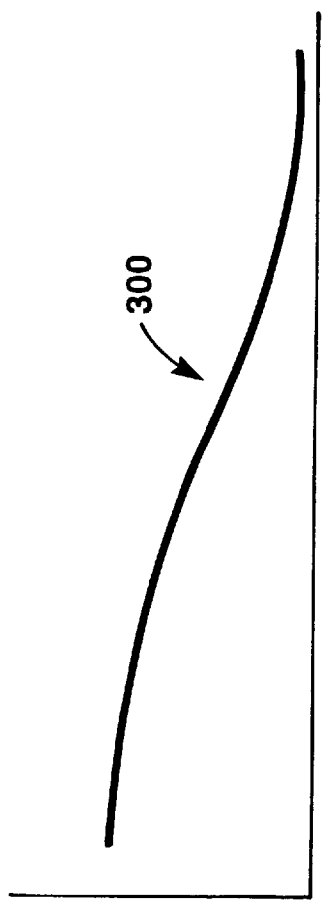
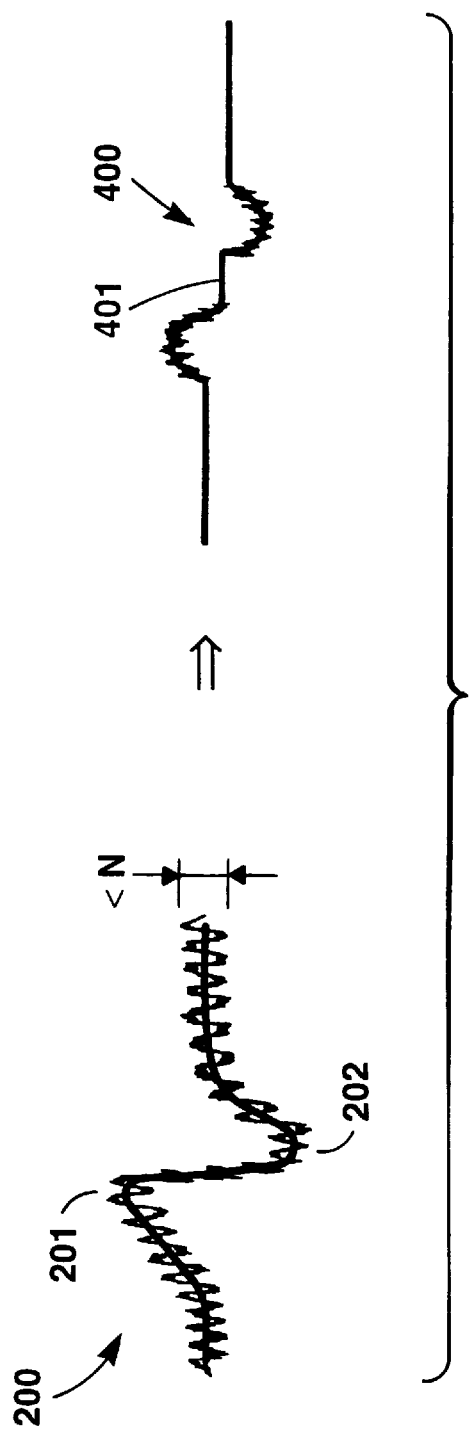

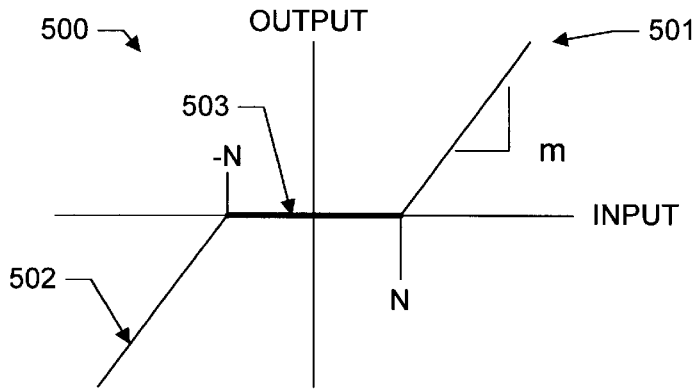
FIG. 5 (PRIOR ART)
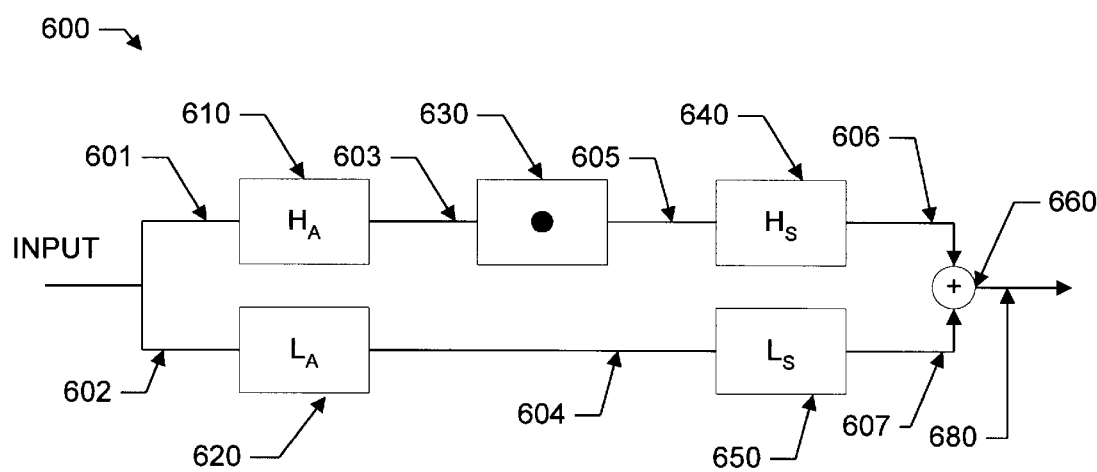
FIG. 6
FIG. 7

METHOD AND APPARATUS FOR ENHANCING IMAGES USING HELPER SIGNALS

BACKGROUND OF THE INVENTION

1. Field of the Invention

The invention generally relates to processing methods and apparatus for enhancing digital image signals. More particularly, the invention relates to a method and extensible architecture for enhancing a sampled digital image by supplementing the sampled digital image signal with at least one helper signal, derived from the sampled digital image.

2. Description of Related Art

Image enhancement generally refers to performing certain operations on image data to make an image more useful or desirable to a user. Among other things, these operations may include contrast manipulation, noise reduction, edge crispening and sharpening, filtering, interpolation and magnification and the like.

Among the known enhancement techniques is "coring." As will be explained with reference to FIGS. 1–5, the coring technique can reduce noise and sharpen edges, assuming that the noise is of relatively small amplitude in comparison to the informational components of an image signal.

FIG. 1 shows a time-based signal 10, representative of an edge within an image, juxtaposed with a degraded signal 100, which is representative of signal 10 after it has been degraded, for example, by transmission over an information network. Degraded signal 100 includes noise fluctuations 110 and is "blurred," i.e., the time duration of the edge transition B of degraded signal 100 is larger than the time duration of the edge transition A of signal 10.

In coring, the degraded signal 100 is, initially, high-and low-pass filtered to yield a high-pass component 200 (FIG. 2) and a low-pass component 300 (FIG. 3). As is further explained below, the high-pass component 200 is operated on and reconstructed with the low pass component 300 to yield the enhanced signal.

The high-pass component 200 includes fluctuations 210, corresponding to the noise fluctuations 110 of signal 100 (FIG. 1), and a "doublet" 220, corresponding to the edge transition B. The low frequency component 300 has filtered out the high-frequency fluctuations 110 and smoothed the edge transition B.

Then, the high-pass component 200 is applied to a mechanism, such as a diode circuit or look-up-table ("LUT"), having a predetermined, non-linear input signal/output signal "characteristic," such as the one of FIG. 5. When the high-frequency component 200 is so applied, the mechanism yields no output for any input, i.e., both the noise or information components, having an amplitude less than limit N. On the other hand, any input having an amplitude greater than limit N results in an output. The output, in turn, is linearly related to the input signal, according to linear portions 501 or 502, which are characterized by slope value "m."

To date, there are no standard criteria for judging a "good" image from a "poor" image. Consequently, image enhancement techniques, including coring, are largely empirically based. In the instant case, both the limit N and the slope m are empirically determined.

When determining a limit N, a tradeoff is made between desirably eliminating more noise and undesirably eliminating "true" information components that have a low amplitude. A higher value of N eliminates more noise and also eliminates more "true" information; a lower value of N avoids elimination of low amplitude information, but allows more noise to pass.

When determining "m" a decision is made as to how much boosting, e.g., edge sharpening, is desirable to a viewer. In conventional designs, the amount of boosting must usually be limited, because a high amplitude input signal may result in overshoot when displayed, if it is too highly boosted. Moreover, the slope m determines the amplification factor and is at least 1.

FIG. 4, for example, illustrates a "cored" output doublet 400, which corresponds to input doublet 200 after it has been applied to an input/output characteristic mechanism having a judicious choice of N and m. Informational components are boosted and any input signal less than N has been eliminated. In this regard, flat region 401 is significantly exaggerated to illustrate the effect of the coring circuit on small amplitude informational components and noise components.

Lastly, the modified high pass component 400 is added back to low-pass component 300 to form the enhanced image signal. In this regard, FIGS. 3 and 4 are not drawn to scale.

The above description and FIGS. 1–5 use "continuous" signals for descriptive purposes only. Persons skilled in the art will appreciate that the above description is also germane to digital images and coring techniques, as well. FIG. 6, for example, illustrates a digital-implementation of a coring architecture, such as the one disclosed by Ebihara et al., in U.S. Pat. No. 4,163,258. Similar structures are also disclosed in U.S. Pat. Nos. 4, 805,031, and 4,549,212, among others.

In the Ebihara implementation, the coring system 600 receives an input signal on high-frequency leg 601 and on a low-frequency leg 602. The high-frequency leg 601 includes a high-pass filter 610. Likewise, the low-frequency leg 602 includes a low-pass analysis filter 620. The high-and low-pass filters 610 and 620 may be thought of as "analysis filters" comprising an "analysis stage." In fact, the Ebihara implementation further discloses legs for intermediate frequency bands, but the discussion of these legs is omitted for the sake of brevity, as an explanation of the high-and low-frequency legs are all that is necessary to understand the fundamental concepts of coring in a digital implementation.

Output 603 of analysis filter 610 thus corresponds to the high frequency components of the input signal. This output 603 is then applied to a "point operator" 630, which implements the non-linear characteristic of FIG. 5 with a LUT, for example.

The output 605 of the point operator 630 is then applied to a synthesis filtering operation 640, and the low frequency filtered signal 604 is applied to a low-pass synthesis filtering operation 650. As such, leg 607 transmits a signal corresponding to the low frequency components of the input signal, and the leg 606 transmits a signal corresponding to the modified high pass components.

Outputs of legs 606 and 607 are then added by signal summer 660 to produce an enhanced signal 680. The synthesis filters 640 and 650 in conjunction with adder 660 comprise a synthesis stage.

The above style of architecture is sometimes referred to as a "filter bank architecture," because the arrangement of filters 610, 620, 640, 650 forms a channel filter bank with a perfect reconstruction property, if the point operator 630 were omitted. The filters 610 and 620 are the "analysis stage" of the filter bank and the filters 640 and 650 with adder 660 are the "synthesis stage."

The context often limits the types of image enhancement techniques that may be practically used. Some fields, such as satellite imagery, may be more willing to incur heavy computational loads to yield an image having the highest fidelity and quality possible. Other contexts must weigh image enhancement techniques against performance concerns. In the field of video-conferencing, for example, images must be produced in synchrony with audio in "real-time," i.e., no discernable delay. The images may be processed with digital circuitry, or with software implementations, and the image signal is typically in accordance with predetermined industry standards.

Although the filter bank architectures outlined above should enhance image signals, they are costly to implement, because of the substantial computation needed for filtering both the high and low frequency legs. The heavy computational requirements not only increase cost but affect the viability of such architectures in real-time, performance critical applications, such as video-conferencing.

U.S. Pat. No. 4,442,454 discloses a "clipping and subtracting" structure, which does not use a low frequency leg and, thus, does not incur the cost of low pass filter operations. Rather, the clipping and subtracting structure generates noise estimates from the image signal by removing, or clipping, all informational components of the image, and then subtracting the noise estimates from the original signal. Because the informational components, e.g., doublet 220 (FIG. 2), are removed to produce the noise estimates, the informational components cannot be boosted or otherwise modified, and thus the clipping and subtracting system is limited to noise removal.

Consequently there is a need in the art for a method of, and apparatus for, enhancing image signals in a computationally efficient manner.

As such, it is an object of the invention to provide such a method and apparatus.

It is a further object to provide such a method and apparatus, which allows both noise removal and edge sharpening.

It is yet a further object to provide such a method and apparatus, which further allows noise removal, edge sharpening, the prevention of overshoot, and is extensible to other enhancements.

It is still a further object to provide such a method and apparatus, which enhances images efficiently enough to provide "real-time" production of video signals without requiring exceptionally costly computational facilities.

SUMMARY OF THE INVENTION

The instant invention allows multiple enhancement operations, including noise removal and edge sharpening, to be performed on an image signal in an integrated manner, without incurring the computational penalty of a low-pass leg, used in filter bank architectures, and without incurring a constraint in the choice of analysis and synthesis filters to maintain the reconstruction property of the filter bank. A novel architecture produces an enhanced image signal by supplementing the original signal with a "helper signal," which is derived from the signal to be enhanced.

A preferred embodiment, unlike filter bank architectures, requires no filtering or other operations on a low-pass leg. Thus, the helper signal architecture of the invention is more efficient than the filter bank architecture. As such, less expensive hardware may be used to realize the invention, or alternatively, the "saved compute cycles" may be used to perform different useful tasks. Likewise, given the improved efficiency of the architecture, the instant invention may be realized on a general purpose computer, programmed to implement the various filters and other functions. The improved efficiency also allows the architecture to be used in real-time, performance-critical applications, such as desktop video-conferencing.

The invention includes a filter that receives a digitized image signal, representative of the image to be enhanced, and produces a frequency band signal by filtering the digitized signal. A preferred embodiment uses a pair of first-order diagonal high pass filters, but other filters may be substituted.

The frequency band signal is applied to a point operator, which implements a novel non-linear input/output characteristic. The point operator produces a modified signal as an output in response to the frequency band signal being applied as an input. At a minimum, the novel input/output characteristic includes a first region, corresponding to low amplitude input signals and thus also to noise components of the image signal. The first region has a negative slope that depends on the filters employed by the system, the negative slope maximizing the suppression of noise.

The novel input/output characteristic, i.e., the "non-linearity," may further include additional regions corresponding to other amplitude ranges of interest of the frequency band signal. For example, a second region may correspond to an "informational" range of amplitudes, that is, a range of amplitudes in which information, not noise, is expected to reside. If edge sharpening is desired, the second region would have a positive slope corresponding to the amount of boost desired. For example, if it is desired to produce an enhanced image having its edge information amplified by 1.5, the amount of boost and the slope is 0.5; if it is desired to produce an enhanced image having its edge information amplified by 2.0, the amount of boost and the slope is 1.0.

The input/output characteristic may further include a third region, corresponding to a range of input amplitudes, which also corresponds to informational content of the image, but which is desirably less boosted or not boosted. For example, if very high amplitudes are boosted, perceptible overshoot may occur when the boosted image signal is eventually displayed. The third region transitions from the second region with a negative slope to a flattened portion, corresponding to a substantially constant zero output value. Thus, this region, although having a negative slope, produces positive amounts of boost, albeit smaller amounts of boost for larger input signals until a certain predetermined limit is reached, past which, no boosting is provided, i.e., the curve is flat and produces zero output.

The modified signal is applied to a second filter, which then produces the "helper signal." The non-linear point operator may lead to signal components outside of the frequency band defined by the first filter. The second filter or synthesis filter attenuates these "out-of-band" signal components. The helper signal contains "enhancement information" having, for example, the noise reduction and boosting components summarized above.

The helper signal and the digitized image signal are then added, which yields the enhanced image signal. For example, the noise reduction components would cancel the corresponding noise in the image signal, and the boosting components would add to the edge information and the like.

The system and method are extensible, and a preferred embodiment uses additional legs, each having corresponding analysis filters, point operators, and synthesis filters to operate on other frequency bands, or to filter along other directions of the digitized image signal.

BRIEF DESCRIPTION OF THE DRAWINGS

The above and furthered advantages of the invention may be better understood by referring to the following description in conjunction with the accompanying drawings, in which FIG. 1 illustrates an original signal and a degraded signal;

FIG. 2 illustrates a high frequency component of the degraded signal;

FIG. 3 illustrates a low frequency component of the degraded signal;

FIG. 4 illustrates prior art modification of the high frequency component;

FIG. 5 illustrates a non-linear input/output characteristic used in the prior art;

FIG. 6 illustrates a prior art coring system structure;

FIG. 7 illustrates a generic embodiment of the invention;

FIG. 9 illustrates various filter impulse responses used by a preferred embodiment of the invention;

DETAILED DESCRIPTION OF PREFERRED EMBODIMENTS

Figures 8, 9A, 9B, 9C, 9D:
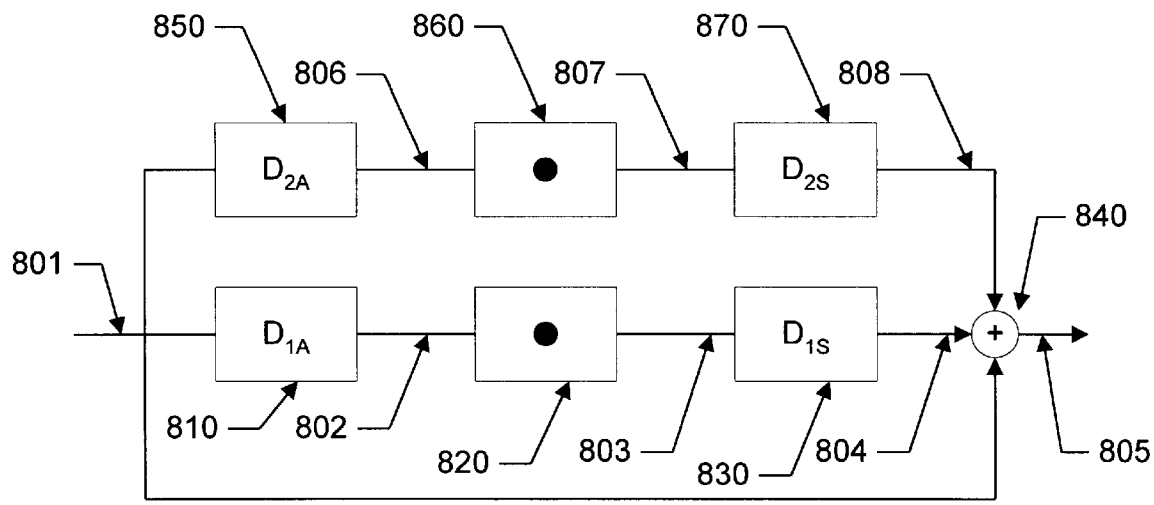
FIG. 8 illustrates a preferred embodiment of the invention.

The immediately following description generically explains a single-band helper signal architecture 700 (FIG. 7) and will be followed by more particular descriptions. Although these descriptions are directed to digital implementations, a person skilled in the art, upon reading this description, will appreciate that the present invention may be realized with analog implementations.

The helper architecture 700 receives a digital image signal 701 on leg 701. Leg 701 is used to derive a helper signal 704, which is used to supplement the image signal. The inputted signal 701 is preferably pre-sampled and thus comprises a stream of incoming data samples. The input signal 701 is received by a first, or analysis, filter 710, which filters the signal with a high-pass filter. The resulting high-pass components 702 are then applied to point operator 720. Point operator 720 may be implemented as a LUT, which may be realized with various known techniques. The resulting, modified high-pass signal 703 is applied to a second, or synthesis, filter 730. The synthesis filter 730 produces helper signal 704, which is applied to signal summer 740, which also receives original signal 701. The resulting summation yields enhanced image signal 705.

As is readily seen from FIG. 7, the helper signal architecture adds a helper signal 704, which is derived from the original signal 701, to the original signal 701 to yield the enhanced image 705. There is no processing of a low frequency leg required. As explained above, this is a considerable performance advantage.

The helper architecture focuses on a particular frequency band, such as the high frequency band, to "glean" useful information from that frequency band so that it may be used to derive helper signals to enhance the image signal. That is, the above generic explanation demonstrates that the helper architecture is applicable to many image enhancement techniques, particularly ones in which a desired enhancement may be gleaned from information obtained from a particular frequency band. As such, although a preferred embodiment gleans information from a high frequency band to reduce noise, sharpen edges, and prevent overshoot of am image, filter coefficients and LUT values may be changed to implement other enhancement techniques to operate on other frequency bands, while preserving the overall generic architecture 700.

Moreover, the helper architecture is extensible and may include additional legs to introduce several helper signals to enhance the image. For example, noise suppression can be performed in one channel, while information components are boosted in another channel.

In addition, FIG. 8 illustrates a more particular embodiment of the invention directed to at least noise reduction and preferably to edge sharpening, which avoids overshoot. A digitized pre-sampled image signal 801 is supplied to the system using conventional techniques. This signal, for example, may be transmitted from a first computer system to a second computer system using protocols and standards known in the video-conferencing field.

The input signal 801 is received by a first input of signal summer 840, by an input of first diagonal filter 810, and by an input of second diagonal filter 850. These filters are further explained below. First filter 810 and second filter 850, respectively, produce first high-pass signal 802 and second high-pass signal 806. The first and second filter 810 and 850 comprise an analysis stage.

The first high-pass signal 802 and second high-pass signal 806 are applied to point operators 820 and 860. The point operators produce modified high-pass signals 803 and 807 in accordance with novel nonlinear input/output characteristics, described below.

The modified high pass signals 803 and 807 are then applied to a synthesis stage comprising first synthesis filter 830 and second synthesis filter 870. Synthesis filters 830 and 870 filter the received signals, according to synthesis transform operations corresponding to the transforms used by first and second analysis filters 810 and 850, and produce a first helper signal 804 and a second helper signal 808. Each helper signal, for example, corresponds to a particular diagonal component of the two-dimensional input signal 801.

Signal summer 840 receives original signal 801, first helper signal 804, and second helper signal 808 and adds them to produce enhanced image signal 805. Although not shown in FIG. 8, known alignment mechanisms and techniques may be used to align the various signals.

FIG. 9A illustrates the impulse response of a diagonal digital filter, corresponding to first analysis filter 810 of a preferred embodiment; and FIG. 9B illustrates the impulse response, corresponding to second analysis filter 850. In addition, FIG. 9C illustrates the impulse response, corresponding to first synthesis filter 830; and FIG. 9D illustrates the impulse response, corresponding to second synthesis filter 870. This method of describing filters is known in the art, and these filters are further discussed below. Although the invention is not limited to these particular filters, a preferred embodiment uses these filters to determine differences between diagonally adjacent pixels of an image signal. These particular filters have been found to result in a favorable summation to help noise cancellation and the like. Other high-pass filter operations may be substituted without losing the generality of the invention.

Figure 10:
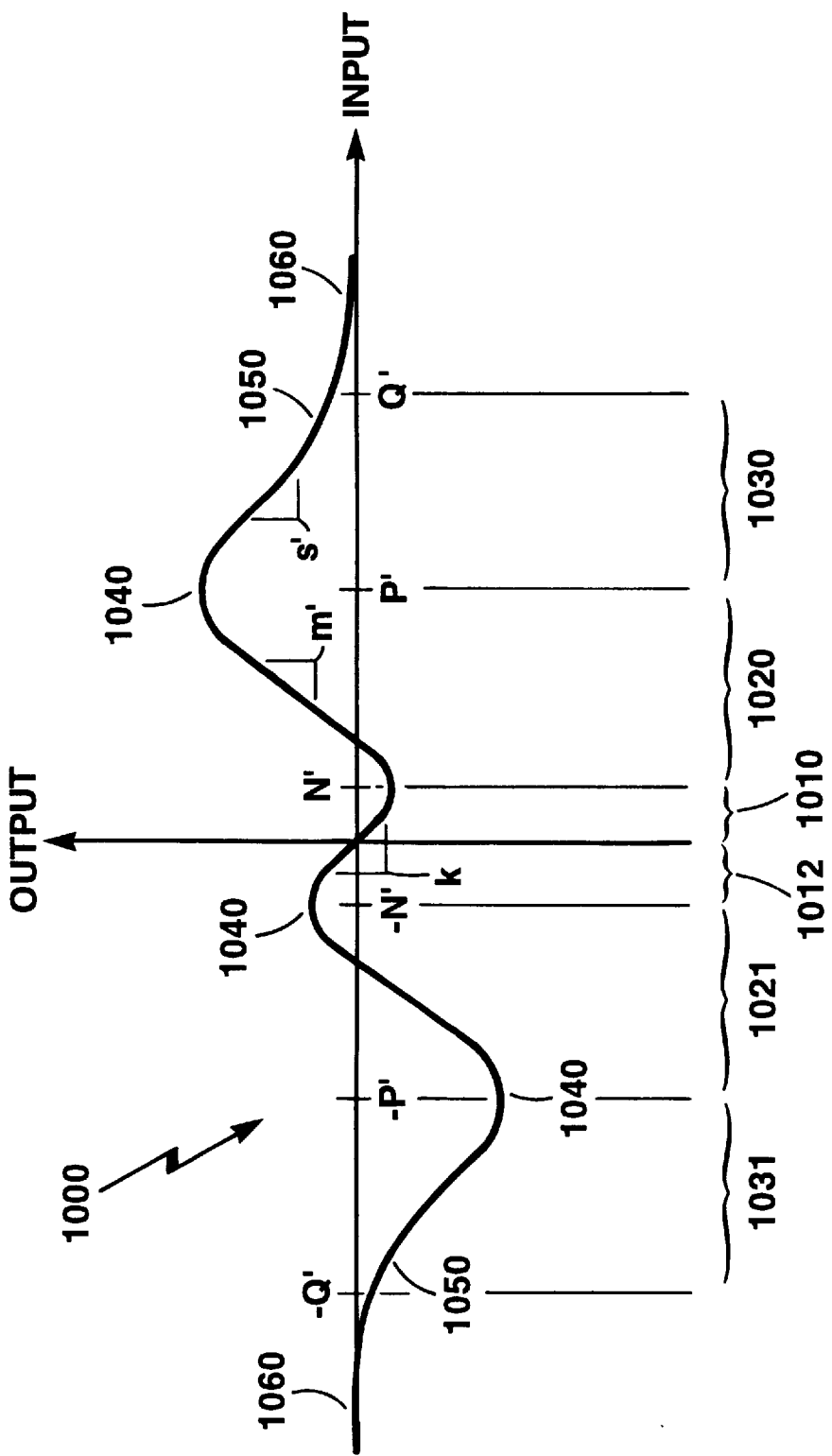
FIG. 10 illustrates a input/output characteristic realized within preferred embodiment of the invention.

FIG. 10 illustrates a preferred novel, non-linear input/output characteristic, relating input signal values to output signal values, realized by point operators 820 and 860. A preferred embodiment uses known LUT techniques to implement the nonlinearity 1000. Moreover, although FIG. 8 illustrates two point operators, techniques may be employed so that the actual data values used to implement the LUT may be shared among the point operators, thus saving hardware and memory resources.

A few initial comments of nonlinearity 1000 are warranted, before embarking on a particular description thereof. The input/output characteristic 1000 is symmetrical about the origin. To aid clarity, the following description primarily focuses on the "right half" of the input/output characteristic, i.e., positive input values. Given a thorough description of the right half, a brief description of the "left half" is all that is necessary for a proper understanding.

The right half of novel nonlinearity 1000 includes a first region 1010, a second region 1020, and a third region 1030. First region 1010 corresponds to that portion of the nonlinearity 1000, which produces noise reduction components, and extends from the origin to the knee N' with a negative slope k. The appropriate value of k depends upon the filters being used in the analysis and synthesis stages. For example, with the impulse responses illustrated in FIGS. 9A–D, a preferred embodiment uses k=−0.2. A method of determining the appropriate slope is provided below.

Unlike conventional nonlinearity 500 (FIG. 5), which produces no output for inputs falling within the flat portion 503, any components of the inputted high-pass signals 802 or 806 that fall within the first region 1010 cause the point operators to produce noise reduction components that depend on slope k. As such, components of the original signal 801 having a high frequency and an amplitude less than N' will eventually be canceled as a result of the noise reduction components that are eventually incorporated into the derived helper signal(s).

The slope k of the first region may be determined to yield maximum suppression of noise. The value of the slope depends upon the actual filters used in the rest of the system 800. In addition, the slope may also be different depending upon the type of noise which is to be suppressed. Although the description below focuses on the suppression of white noise, in some situations non-white noise, which is not spectrally flat, might have to be suppressed and a somewhat different slope k would be appropriate. For example, the overall frequency response of system 800 is $$F(\omega_1,\omega_2)=1+kD_{1A}(\omega_1,\omega_2)\,D_{1S}(\omega_1,\omega_2)+kD_{2A}(\omega_1,\omega_2)\,D_{2S}(\omega_1,\omega_2)$$

The brightness remains unchanged in a preferred embodiment. Thus, $$F(0,0)=1$$

This is met with high-pass filters, i.e., $$D_{1A}(0,0)=D_{1S}(0,0)=D_{2A}(0,0)=D_{2S}(0,0)=0$$

This being the case, the slope k may then be chosen by minimizing the following equation to yield maximum suppression of white noise:

$$\int_{\omega_1}\int_{\omega_2}|F(\omega_1,\omega_2)|^2 d\omega_1 d\omega_2 \rightarrow \text{minimum}$$

For the preferred impulse responses of FIGS. 9A-D, the corresponding frequency responses are as follows (the arrows show x=y=0, i.e., the (x,y) origin of the impulse response):

$$D_{1A}(\omega_1,\omega_2) = 1 - e^{-j\omega 1 - j\omega 2} \qquad d_{1A}(x,y) = \begin{bmatrix} 1 & 0 \\ 0 & -1 \end{bmatrix} \leftarrow$$
$$\uparrow$$

$$D_{1S}(\omega_1,\omega_2) = 1 + e^{j\omega 1 + j\omega 2} \qquad d_{1S}(x,y) = \begin{bmatrix} 1 & 0 \\ 0 & -1 \end{bmatrix} \leftarrow$$
$$\uparrow$$

$$D_{2A}(\omega_1,\omega_2) = 1 - e^{j\omega 1 - j\omega 2} \qquad d_{2A}(x,y) = \begin{bmatrix} 0 & 1 \\ -1 & 0 \end{bmatrix} \leftarrow$$
$$\uparrow$$

$$D_{2S}(\omega_1,\omega_2) = 1 + e^{-j\omega 1 + j\omega 2} \qquad d_{2S}(x,y) = \begin{bmatrix} 0 & 1 \\ -1 & 0 \end{bmatrix} \leftarrow$$
$$\uparrow$$

With these frequency responses, the integral above is minimized with a k=−0.2. Moreover, the slope k may similarly be determined for other filters and more channels.

Second region 1020 corresponds to a range of amplitudes in which information, not noise, is expected to reside. Region 1020 extends from an end of the first region to point P' with a positive slope m'. The positive slope m' corresponds to the amount of boost desired, i.e., the amount of information to be added. For example, if it is desired to produce an enhanced image having its edge information amplified by 1.5, the amount of boost and the slope m' is 0.5; in contrast, conventional nonlinearity 500 would have a slope of 1.5. The initial portion of the second region—i.e., the portion extending from the first region through and until the curve 1000 crosses the abscissa—produces negative output values for positive input values and, in effect, provides a soft transition to the "boosting" portion of the second region 1020. The boosting portion begins at the point where the curve 1000 crosses the abscissa and continues to P'. In this portion, the amount of output signal is the amount added to the informational component of the original signal. Consequently, any input signal falling within this portion yields an output signal having the same sign as the input and amplified according to slope m'.

Third region 1030 also corresponds to a range of amplitudes in which information, not noise, is expected to reside. This region, however, transitions the nonlinearity 1000 to flat portions 1060. Consequently, signals in the second region 1020 may be heavily boosted, if so desired, without fear of having the boosting operation causing overshoot for high contrast edges. This is so, because the third region ensures that the amount of boost (i.e., the output value) provided in response to an input signal eventually transitions to no boost for very high input signals, i.e., flat portion 1060. Region 1030 extends from P' onward and is characterized, in part, by a negative slope s'. Similarly to that discussed above, P' and s' are empirically determined and may be modified. Moreover, third region 1030 may include additional transitions 1050 which smoothly change the slope of the regions 1030 until the slope is eventually zero in flat portion 1060. As such, very large amplitude input signals, i.e., greater than Q', result in an output (i.e., boost component) that is 0.

Much of the above discussion focuses on linear regions of curve 1000 and characterizes the region with a constant slope. Those skilled in the art will appreciate that the description in this regard is somewhat simplified to aid clarity. Moreover, skilled artisans, upon viewing FIG. 10, will appreciate that the curve is truly nonlinear and resembles an "odd" function having smooth transitions 1040 connecting the linear regions. These soft transitions 1040 are also empirically determined and are easily realized with known LUT techniques and the like.

First region 1010, second region 1020, third region 1030 have corresponding analogous regions 101 1, 1021 and 1031 which operate similarly to the above-described regions, but which correspond to input signals having negative amplitude.

Although the above description refers to LUTs 820 and 860 having novel nonlinearity 1000, persons skilled in the art will appreciate that each LUT 820 and 860 may have a nonlinearity that is particularly modified for that leg, i.e., the LUTs need not be identical. If distinct nonlinearities are desired, two separate LUTs are used, rather than sharing the LUT resources among the legs, as discussed above.

As suggested above, the improved efficiency allows the invention to be realized in cheaper hardware. Alternatively, the invention may be realized in a computer system having the various filters, LUTs and summation operations implemented in software stored in a memory and controlling the CPU of the computer system.

Figure 11:
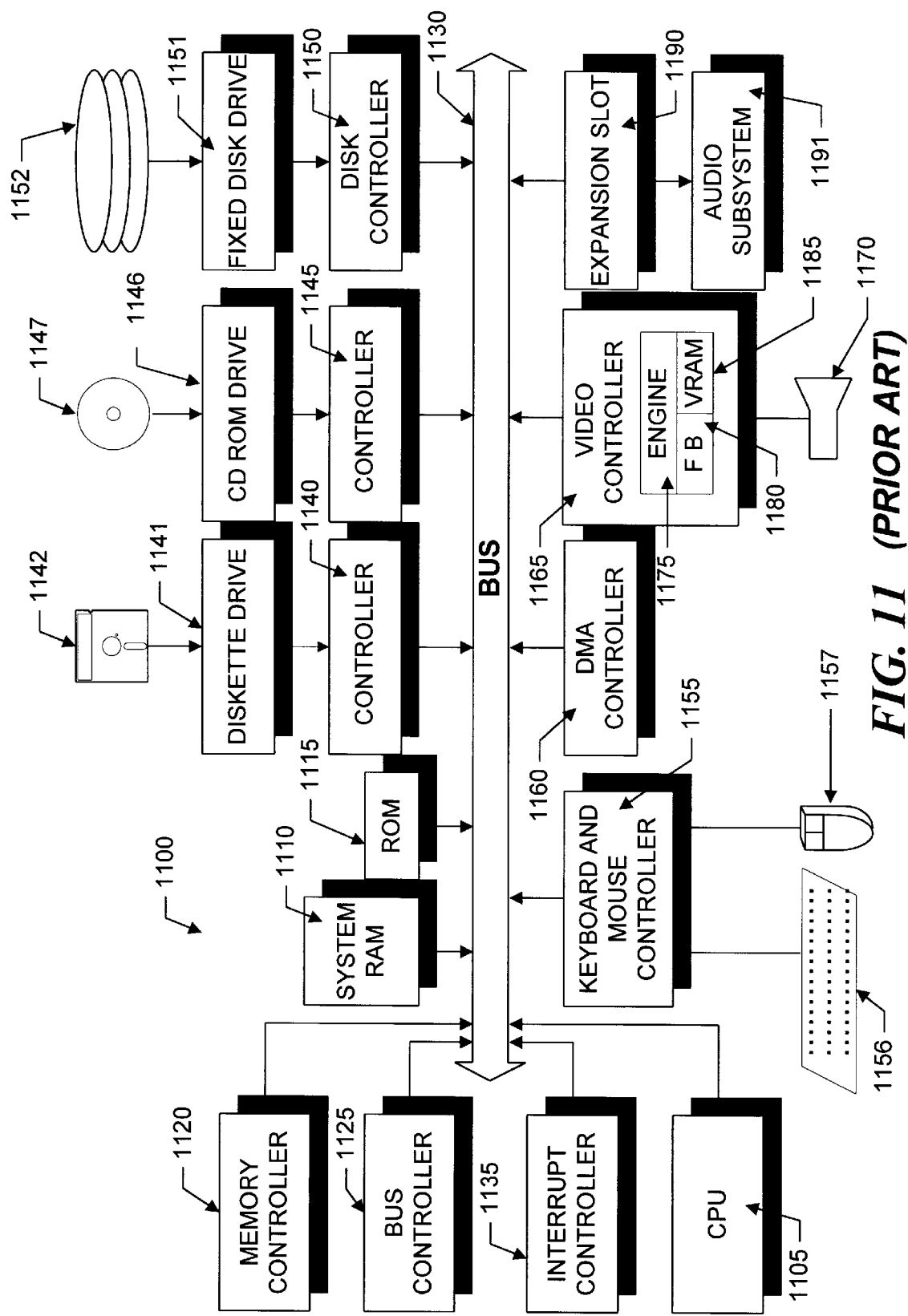
FIG. 11 illustrates a general purpose computer which may be used to realize a preferred embodiment of the invention.

FIG. 11, for example, illustrates an exemplary general purpose computer, such as an IBM PS/2® computer, that may be used to realize one embodiment of the invention. The exemplary computer 1100 includes a central processing unit ("CPU") 1105, which may include a conventional microprocessor; a system random access memory ("RAM") 1110 for temporary storage of information and a read only memory ("ROM") 1115 for permanent storage of information. A memory controller 1120 is provided for controlling system RAM 1110; a bus controller 1125 is provided for controlling bus 1130; and an interrupt controller 1135 is used for receiving and processing various interrupt signals.

Mass storage may be provided by a diskette 1142, a CD-ROM disk 1147 or a hard disk 1152. The diskette 1142 can be inserted into a diskette drive 1141, which is, in turn, connected to bus 1130 by a controller 1140. Similarly, the CD-ROM disk 1147 can be inserted into a CD-ROM drive 1146, which is also connected by a controller 1145 to bus 1130. Finally, hard disks 1152 are part of a fixed disk drive 1151, which is connected to bus 1130 by controller 1150.

Input and output to computer system 1100 are provided by a number of devices. For example, a keyboard and mouse controller 1155 connects to bus 1130 for controlling a keyboard input device 1156 and a mouse input device 1157. A DMA controller 1160 is provided for performing direct memory access to system RAM 1110. A visual display is generated by a video controller 165, which controls a video output display 1170. Video controller 1165 may include a graphics engine 1175, a frame buffer 1180, and off-screen VRAM 1185. Other input and output devices, such as an audio subsystem 1191, may be connected to the system through expansion slot 1190.

The computer 1100 is generally controlled and coordinated by operating system software, such as the OS/2® operating system, available from the International Business Machines Corporation ("IBM"), Boca Raton, Florida, or the Windows operating system, available through Microsoft Corp. Conventional operating systems control and schedule computer processes for execution, perform memory management, provide file system, networking, and I/O services, and provide a user interface, such as a graphical user interface ("GUI"), among other things. User applications, such as editors and spread sheets, directly or indirectly, rely on these and other capabilities of the operating system.

Persons skilled in the art know how to construct the appropriate software routines to implement the above described sampling, filtering, LUT modification, and summation operations. These routines may then be compiled, linked, and loaded into the system memory using conventional techniques to realize the invention as a special program controlling the general purpose computer.

As outlined above, certain applications, such as videoconferencing, are performance critical. The preferred embodiment described above uses two high frequency legs, because of the existing computational capacity of personal computers and other lower end systems. However, other higher cost systems have more computation capacity, and may use the invention in embodiments that realize more frequency bands and the like. Moreover, future personal computers and lower end systems are expected to have improved computational capacity and likewise may extend the described helper signal architecture to include more helper signals and to implement multi-scale filtering.

The foregoing description has been focused upon an illustrative embodiment, and certain variations, of the invention. Other variations and modifications, however, may be made to this embodiment, which will attain some or all of the advantages of the invention. It is, therefore, an object of the appended claims to cover all such variations and modifications that come within the true spirit and scope of the invention.

What is claimed is:

1. A system for enhancing digitized image signals, comprising:

an analysis filter for filtering the digitized image signals to produce first frequency band signals;

a point operator responsive to first frequency band signals for generating noise reduction signals and image sharpening signals;

a synthesis filter that filters the noise reduction signals and image sharpening signals to produce noise reduction helper signals and image sharpening helper signals, the synthesis filter shaping artifacts introduced by nonlinearities associated with the point operator to a desired pattern, and the combination of analysis and synthesis filtering resulting in at least one of smoothing along the edge and sharpening orthogonal to the edge of the image signal; and a summing node by which the noise reduction helper signals, the image signal enhancement signals and the digitized image signals are combined to yield enhanced digitized image signals.

2. The system of claim 1 wherein the point operator is responsive to first frequency band signals having absolute amplitudes less than a predetermined threshold for generating negative noise reduction signals and responsive to first frequency band signals having absolute amplitudes greater than the predetermined threshold for generating positive image signal enhancement signals.

3. A system for enhancing a digitized image signal, comprising:

an analysis filter that filters the digitized image signal to produce a first frequency band signal;

a point operator, responsive to the first frequency band signal, that provides a modified signal, the point operator including a non-linear characteristic to produce the modified signal, the non-linear characteristic having a first region, corresponding to low amplitude first frequency band signals, with a first predetermined negative slope, and further having a second region, corresponding to higher amplitude first frequency band signals with an amplitude higher than the low amplitude first frequency band signals, the second region having a positive slope;

a synthesis filter that filters the modified signal to produce a helper signal, the synthesis filter shaping artifacts introduced by non-linearities associated with the point operator to a desired pattern, and the combination of analysis and synthesis filtering resulting in at least one of smoothing along the edge and sharpening orthogonal to the edge of the image signal; and a summing node by which the helper signal and the digitized image signal are summed to yield an enhanced digitized image signal.

4. The system of claim 1 further comprising:

at least one additional analysis filter that filters the digitized image signal to produce at least one additional corresponding frequency band signal;

at least one additional point operator, responsive to the additional corresponding frequency band signal, that provides at least one additional modified signal;

at least one additional synthesis filter that filters the additional modified signal to produce at least one additional helper signal; and wherein the additional helper signal is summed at the summing node with the image signal and the helper signal to yield the enhanced digitized image signal.

5. The system of claim 1 wherein the image signal is a two dimensional signal and wherein the analysis filter and the synthesis filter have predetermined impulse responses, each impulse response having non-zero weight diagonal coefficients across a first diagonal and zero weight coefficients across a second diagonal of the impulse response.

6. The system of claim 1 wherein the point operator is determined in accordance with impulse responses of the analysis and synthesis filters, such that a combination of the analysis filter the point operator, and the synthesis filter suppresses white noise.

7. The system of claim 3 wherein the point operator includes a LUT for providing the modified signals in response to the frequency band signal, and wherein the nonlinear characteristic includes a third region for frequency band signals having an amplitude higher than said higher amplitude first frequency signals, wherein the third region has a second negative slope.

8. The system of claim 1 wherein the analysis filter, the point operator, the synthesis filter, and the summing node are implemented on a general purpose computer as software routines.

9. The system of claim 3 wherein the digitized input signal is a real-time video signal according to a predefined signal standard and wherein the enhanced digitized image signal is in the predefined signal standard.

10. The system of claim 3 wherein the first frequency band is a high frequency band.

11. A method of enhancing digitized image signals, the method comprising the steps of:

a) analysis filtering the digitized image signal, to produce first frequency band signals;

b) generating noise reduction signals and image sharpening signals in response to the first frequency band signals;

c) synthesis filtering the noise reduction signals and image sharpening signals to shape artifacts introduced by non-linearities associated with the point operator to a desired pattern and produce noise reduction helper signals and image sharpening helper signals. the combination of analysis and synthesis filtering resulting in at least one of smoothing along the edge and sharpening orthogonal to the edge of the image signal; and d) combining the noise reduction helper signals, the image signal enhancement signals and the digitized image signals to yield enhanced digitized image signals.

12. A method for enhancing a digitized image signal, the method comprising the steps of:

a) analysis filtering the digitized image signal to produce a first frequency band signal;

b) modifying the first frequency band signal in accordance with a non-linear characteristic to produce a modified signal, the non-linear characteristic having a first region with a negative slope for low amplitude first frequency band signals and a second region with a positive slope for higher amplitude frequency band signals;

c) synthesis filtering the modified signal to shape artifacts introduced by nonlinearities associated with the point operator to a desired pattern and produce a helper signal, the combination of analysis and synthesis filtering resulting in at least one of smoothing along the edge and sharpening orthogonal to the edge of the image signal; and d) adding the helper signal and the digitized image signal to yield an enhanced digitized image signal.

13. The method of claim 11 further comprising the steps of:

e) analysis filtering the digitized image signal to produce at least one additional frequency band signal;

f) modifying the additional frequency band signal to produce at least one additional modified signal therefrom;

g) synthesis filtering the additional modified signal to produce at least one additional helper signal; and wherein step D further includes the step of d1) adding the additional helper signal to the image signal and to the helper signal to yield the enhanced digitized image signal.

14. The method of claim 11 wherein the image signal is a two dimensional signal and steps a and c perform filtering steps according to predetermined impulse responses, each impulse response having non-zero weight diagonal coefficients across a first diagonal and zero weight coefficients across a second diagonal of the impulse response.

15. The method of claim 12 wherein the first predetermined negative slope is determined in accordance with the impulse responses of the analysis and synthesis filters, such that a combination of the analysis filter, the point operator, and the synthesis filter suppresses white noise.

16. The method of claim 12 wherein step b includes accessing a LUT that provides the modified signals in response to the frequency band signal, and wherein the non-linear characteristic includes a third region for frequency band signals having an amplitude higher than said higher amplitude first frequency signals, wherein the third region has a second negative slope.

17. The method of claim 13 wherein steps (a)–(d) are executed on a general purpose computer as software routines.

18. The method of claim 13 wherein the digitized input signal is a real-time video signal according to a predefined signal standard and wherein the enhanced digitized image signal is in the predefined signal standard.

19. The method of claim 13 wherein the first frequency band is a high frequency band.

* * * * *